(12) United States Patent
Taya et al.

(10) Patent No.: US 12,497,273 B2
(45) Date of Patent: Dec. 16, 2025

(54) OBJECT LOWERING DEVICE AND OBJECT RAISING AND LOWERING DEVICE

(71) Applicant: TOYOTA JIDOSHA KABUSHIKI KAISHA, Aichi-ken (JP)

(72) Inventors: Hironari Taya, Toyota (JP); Keita Mizuguchi, Toyota (JP); Norihisa Aoki, Toyota (JP); Shinichiro Noda, Nagoya (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 386 days.

(21) Appl. No.: 18/306,237

(22) Filed: Apr. 25, 2023

(65) Prior Publication Data

US 2023/0348244 A1 Nov. 2, 2023

(30) Foreign Application Priority Data

Apr. 27, 2022 (JP) ................................ 2022-073455

(51) Int. Cl.
*B66F 7/00* (2006.01)
*B64G 1/66* (2006.01)
*B66F 7/22* (2006.01)

(52) U.S. Cl.
CPC . *B66F 7/22* (2013.01); *B64G 1/66* (2013.01)

(58) Field of Classification Search
CPC ........ B64G 1/66; B64G 1/222; B64G 1/2221; B64G 1/22; B66F 7/22
See application file for complete search history.

(56) References Cited

U.S. PATENT DOCUMENTS

| | | | | |
|---|---|---|---|---|
| 2,985,983 | A * | 5/1961 | Konstenius | A63H 17/12 414/690 |
| 3,904,194 | A * | 9/1975 | Schwarzkopf | A63G 27/04 472/3 |
| 4,304,400 | A * | 12/1981 | Armstrong | A63G 1/40 472/26 |
| 6,089,670 | A | 7/2000 | Rogers | |
| 10,456,695 | B1 * | 10/2019 | Henley | A63G 27/04 |
| 2001/0041127 | A1 | 11/2001 | Cross | |

FOREIGN PATENT DOCUMENTS

JP H9-272473 A 10/1997

* cited by examiner

*Primary Examiner* — Steven O Douglas
(74) *Attorney, Agent, or Firm* — HAUPTMAN HAM, LLP (57) ABSTRACT

The object lowering device comprises a pedestal and a swing. The swing includes a seat plate on which an object is placed, and is disposed on the pedestal. The pedestal is tilted with the lower corner of one side in the swinging direction of the pedestal as an axis, and the seat plate of the swing moves down to the ground, whereby the object is lowered to the ground.

9 Claims, 12 Drawing Sheets

OBJECT LOWERING DEVICE AND OBJECT RAISING AND LOWERING DEVICE

CROSS-REFERENCE TO RELATED APPLICATION

This application claims priority to Japanese Patent Application No. 2022-073455 filed on Apr. 27, 2022, incorporated herein by reference in its entirety.

BACKGROUND

1. Technical Field

The present disclosure relates to an object lowering device and an object raising and lowering device.

2. Description of Related Art

Raising and lowering an object on and from a pedestal are performed daily in people's lives. Conventionally, an disclosure for suppressing a damage to an object in raising and lowering the object, a device for reducing a burden on a person in raising and lowering the object, and the like have been studied. In addition, studies have been conducted on how to lower the object from a pedestal such as a transporter (rocket) that has carried the object to a satellite such as the planet or the moon to a ground.

Japanese Unexamined Patent Application Publication No. 9-272473 (JP 9-272473 A) discloses a lunar rover that travels on a lunar surface and performs a survey activity on the lunar surface.

SUMMARY

It is desirable to allow an object placed on a pedestal to be lowered from the pedestal in a horizontal state or a state similar to the horizontal state.

An object of the present disclosure is to allow the object placed on the pedestal to be lowered from the pedestal while suppressing the inclination of the object.

An object lowering device according to a first aspect of the present disclosure includes: a pedestal; and a swing that includes a seat plate on which an object is placed and that is disposed on the pedestal.

When the pedestal is tilted with a lower corner of one side of the pedestal in a swinging direction of the swing as an axis, and the seat plate of the swing is lowered to a ground, the object is lowered to the ground.

In the object lowering device according to the first aspect of the present disclosure, the pedestal may be a rocket that lands on a lunar plane, and when the rocket is tilted on the lunar surface, and the seat plate of the swing is lowered to the lunar surface, the object may be lowered to the lunar surface.

In the object lowering device according to the first aspect of the present disclosure, the object may be a vehicle that travels on the lunar surface.

In the object lowering device according to the first aspect of the present disclosure, the vehicle may include an airbag that is inflated downward, the seat plate of the swing may include a hole through which the airbag projects from a lower surface of the seat plate when the airbag of the vehicle is inflated, and the airbag of the vehicle may be inflated before the rocket is tilted toward the lunar surface and the seat plate of the swing is lowered to the lunar surface.

In the object lowering device according to the first aspect of the present disclosure, the seat plate of the swing may include an airbag that is inflated downward, and the airbag of the seat plate may be inflated before the rocket is tilted toward the lunar surface and the seat plate of the swing is lowered to the lunar surface.

The object lowering device according to the first aspect of the present disclosure may further include: a beam for supporting the seat plate of the swing on an upper side via a hanging portion; and a beam raising mechanism for raising the beam with respect to an upper surface of the pedestal before the pedestal is tilted and increasing a distance between the upper surface of the pedestal and the seat plate of the swing.

The object lowering device according to the first aspect of the present disclosure may further include a locking mechanism for fixing the seat plate of the swing to an upper surface of the pedestal. Before the pedestal is tilted, fixing of the seat plate of the swing to the upper surface of the pedestal by the locking mechanism may be released.

The object lowering device according to the first aspect of the present disclosure may further include an angle adjustment mechanism for adjusting a swing angle of the seat plate by applying a force to the seat plate in the swinging direction of the swing while the pedestal is tilted.

An object raising and lowering device according to a second aspect of the present disclosure includes the object lowering device described above.

The object lowering device functions as the object raising and lowering device, and When the seat plate of the swing is placed on the ground in a state where the pedestal is tilted, the object is placed on the seat plate, and the pedestal is raised with the lower corner of the one side of the pedestal in the swinging direction of the swing as the axis, the object is raised on the pedestal.

According to the present disclosure, the object placed on the pedestal can be lowered from the pedestal in the horizontal state or the state similar to the horizontal state.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described with reference to the drawings. The present disclosure is not limited to the embodiment described below. The number, shape, material, and the like of each member can be changed as appropriate. It is assumed from the beginning that the features of the plurality of embodiments described below are appropriately combined and used. In all the drawings, the same elements are denoted by the same reference numerals, and redundant description is omitted.

In the following description, unless otherwise described, the swinging direction of the swing 18 is defined as the front-rear direction, the direction orthogonal to the front-rear direction is defined as the left-right direction, and the direction perpendicular to the plane consisting of the front-rear direction and the left-right direction is defined as the up-down direction. In the drawings, the direction of the arrow FR indicates the front side, the direction of the arrow UP indicates the upper side, and the direction of the arrow RH indicates the right side.

Figure 1:
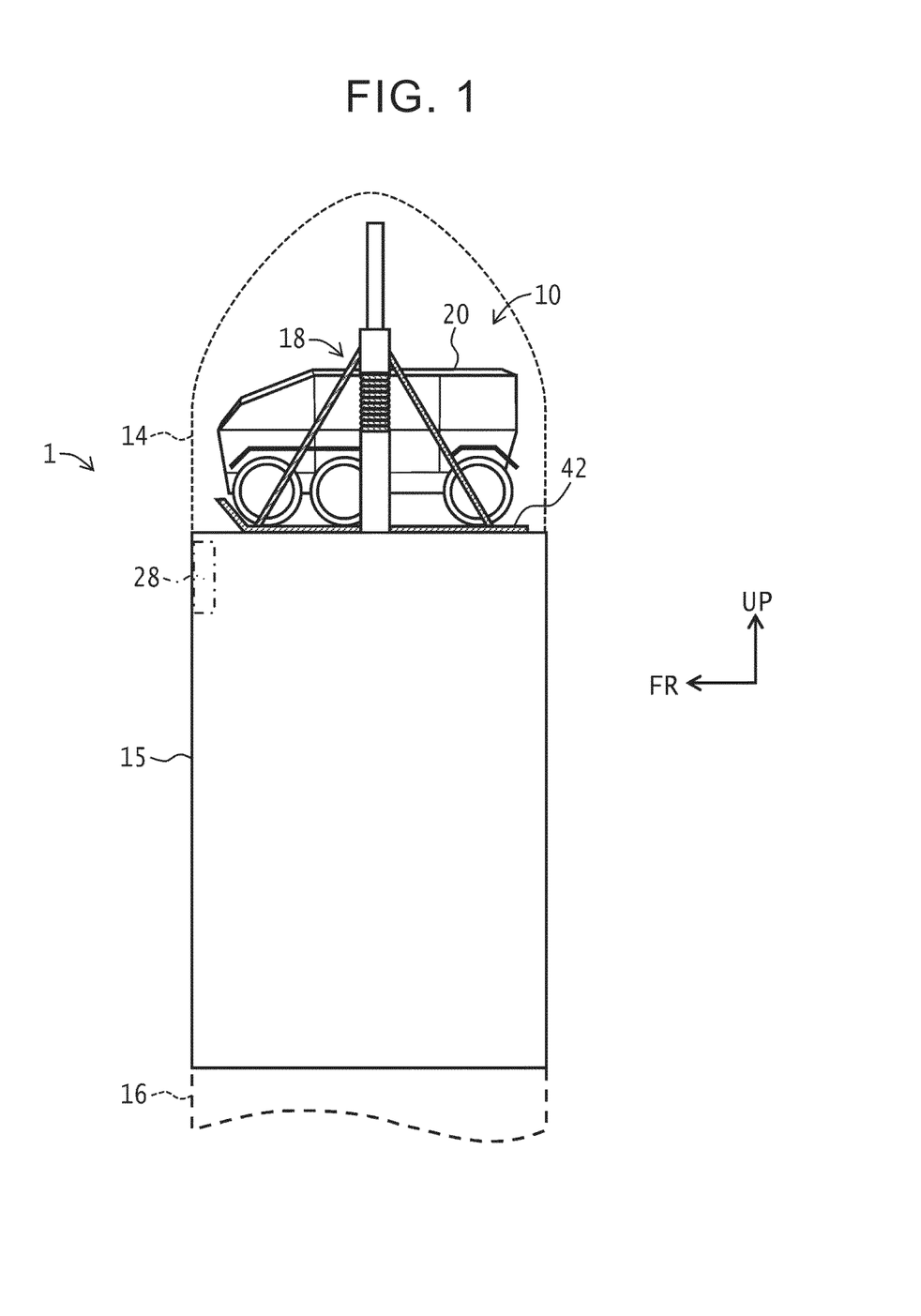
FIG. 1 is a side view schematically showing the vicinity of the tip of a multi-stage rocket 1.

FIG. 1 is a side view schematically showing the vicinity of the tip of a multi-stage rocket 1. The multi-stage rocket 1 is an unmanned rocket that is launched from the earth toward the moon. The multi-stage rocket 1 is launched by automatic control, remote control, or both until the vehicle 20 described below is lowered to the moon plane.

As shown in FIG. 1, the multi-stage rocket 1 includes a lower rocket 16, a moon landing machine 15 disposed on the upper side of the lower rocket 16, and a fairing 14 disposed on the upper side of the moon landing machine 15. A vehicle 20 is disposed on the moon landing machine 15 and inside the fairing 14. The vehicle 20 is a rover that travels on the lunar surface.

After the lower rocket 16 and the fairing 14 are launched, they are disconnected from each other in the Earth's sky or in the outer space, so that only the structure (the vehicle 20 and the like) inside the moon landing machine 15 and the fairing 14 is heading toward the moon. The moon landing machine 15 is a rocket and ejects gas from the lower part. The moon landing machine 15 lands on the lunar plane in the gravitational zone of the moon, with gas blowing out toward the lunar plane in a standing posture. In S1 of FIG. 4A, the moon landing machine 15 landed on the lunar plane is shown. Incidentally, in each of the drawings, the moon landing machine 15 is depicted in a simplified manner. Incidentally, the moon landing machine 15 may include a fixing member that fixes the vehicle 20 to the swing 18 until landing on the lunar surface, a cover that covers the periphery of the vehicle 20, and the like.

Figure 2:
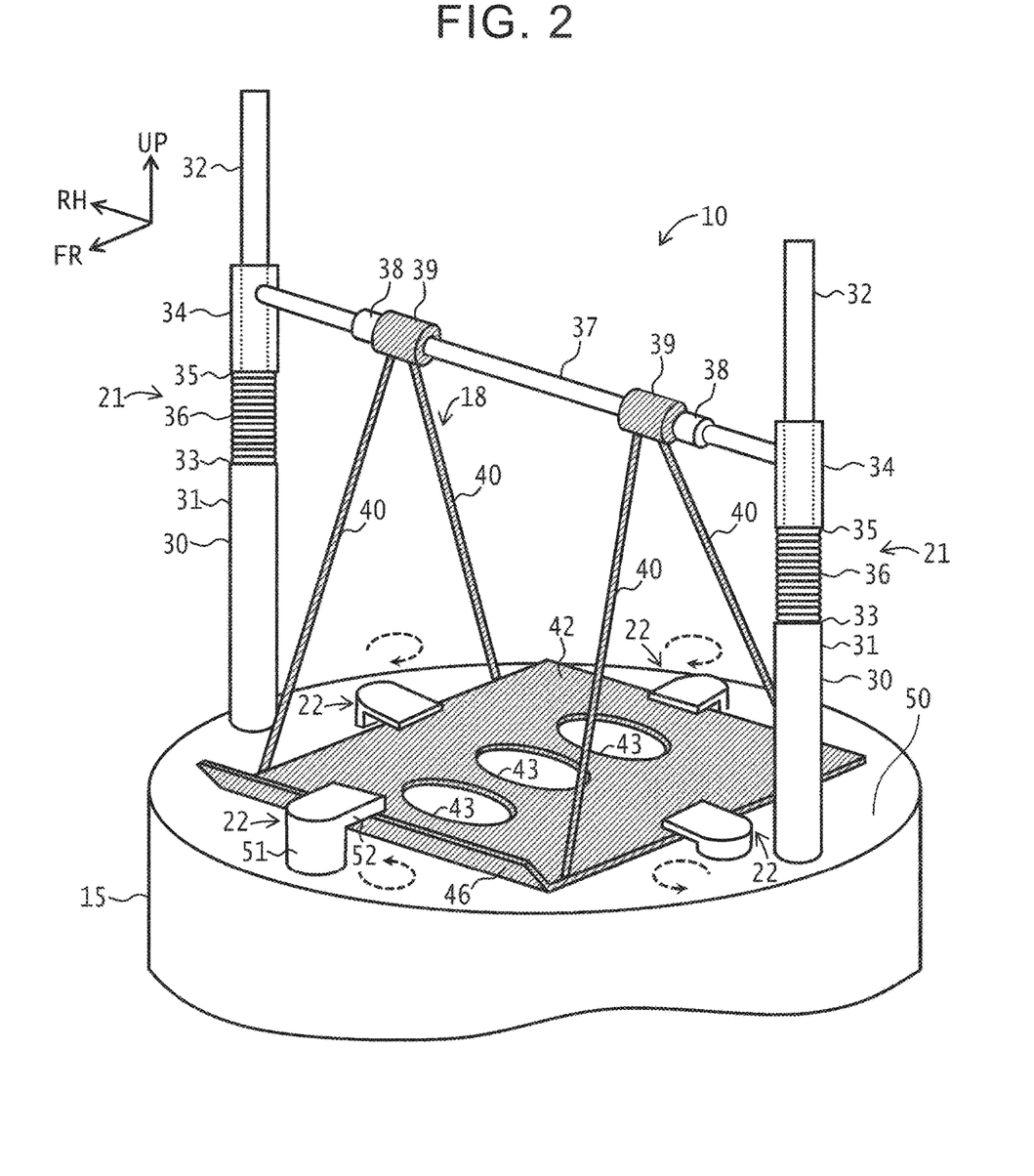
FIG. 2 is a perspective view showing the object lowering device 10.
Figure 3:
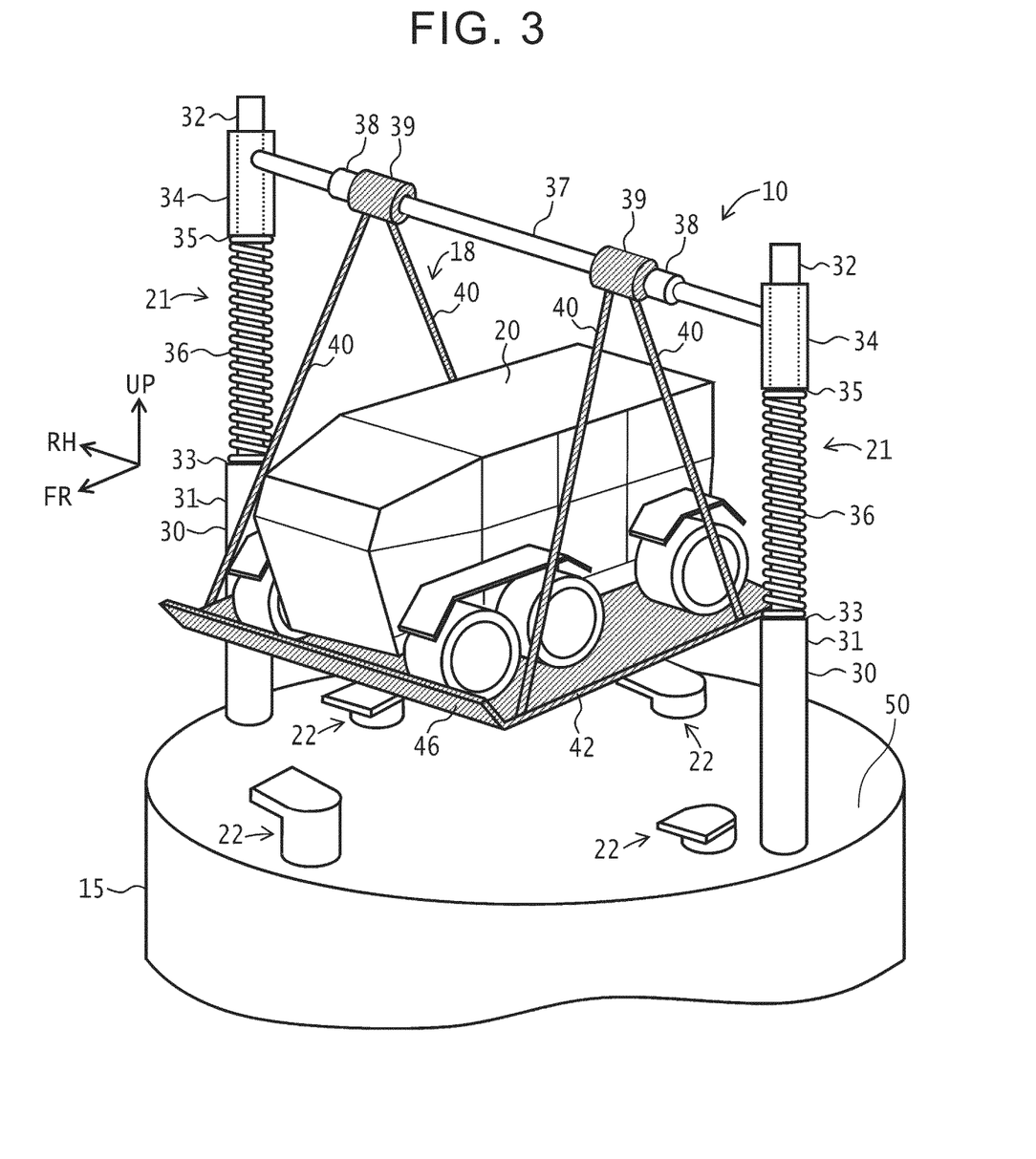
FIG. 3 is a perspective view showing a state in which the vehicle 20 is placed on the swing 18 of the object lowering device 10.

As shown in FIGS. 4A to 4D, the present embodiment is a device (hereinafter, referred to as an object lowering device 10) that lowers the vehicle 20 to the lunar plane from the top of the lunar plane landed on the moon landing machine 15. The moon landing machine 15 is an example of a pedestal, and the vehicle 20 is an example of an object. FIG. 2 is a perspective view showing the object lowering device 10 (the seat plate 42 of the swing 18 is in a fixed state) in which the vehicle 20 is omitted, and FIG. 3 is a perspective view showing the object lowering device 10 (the seat plate 42 of the swing 18 is in a raised state) in which the vehicle 20 is disposed.

As shown in FIG. 2, the moon landing machine 15 has a substantially cylindrical shape having a top plate. The object lowering device 10 comprises a swing 18 arranged on a moon landing machine 15, a beam 37 of the swing 18 and two struts (two fixed support columns 30 and two movable support columns 34) of the swing 18. The beam 37 has a rod shape having a circular cross section, and is bridged between two movable support columns 34. The swing 18 includes two cylindrical rotating portions 39 through which the beams 37 are passed, a seat plate 42 on which the vehicle 20 is placed, and four hanging portions 40 that suspend the seat plate 42 with respect to the two rotating portions 39. The swing 18 is swingable with respect to the beam 37.

The object lowering device 10 includes a beam raising mechanism 21 for raising the beam 37, and a locking mechanism 22 for fixing the seat plate 42 of the swing 18 to the upper surface 50 of the moon landing machine 15.

The beam raising mechanism 21 includes two fixed support columns 30, two movable support columns 34, and two coil springs 36. The two fixed support columns 30 are spaced apart from each other in the left-right direction. The fixed support column 30 has a rod shape having a circular cross section. The fixed support column 30 includes a rod-shaped lower portion 31 fixed to the upper surface 50 of the moon landing machine 15, and a rod-shaped upper portion 32 connected to the upper end of the lower portion 31 and having a diameter smaller than that of the lower portion 31. An end face 33 facing upward is formed between the lower portion 31 and the upper portion 32 of the fixed support column 30.

The movable support column 34 has a cylindrical shape, and an upper portion 32 of the fixed support column 30 is passed therethrough. The movable support column 34 has a downwardly facing end face 35. The coil spring 36 is positioned on the end face 33 of the fixed support column 30 by passing the upper portion 32 of the fixed support column 30 therethrough. The coil spring 36 can expand and contract between the end face 33 of the fixed support column 30 and the end face 35 of the movable support column 34.

As shown in FIG. 2, in a state in which the seat plate 42 of the swing 18 is fixed to the upper surface 50 of the moon landing machine 15 by the locking mechanism 22, the beam 37 of the swing 18 is pulled downward through the four hanging portions 40. In this state, since the two movable support columns 34 are pulled downward through the beam 37, each of the two coil springs 36 is pressed and compressed by the end face 35 of the movable support column 34.

When the fixing of the seat plate 42 of the swing 18 to the upper surface 50 of the moon landing machine 15 by the locking mechanism 22 is released, since each movable support column 34 is in a free state, as shown in FIG. 3, each coil spring 36 pushes up and extends the end face 35 of the movable support column 34. Thus, the beam 37 of the swing 18 is raised, the space between the seat plate 42 of the swing 18 and the upper surface 50 of the moon landing machine 15 will be provided. The reason for providing a distance between the seat plate 42 of the upper surface 50 and the swing 18 of the moon landing machine 15 as described above, when the moon landing machine 15 is defeated, as shown in (S5) of FIG. 4B (see the distance D), the upper surface 50 of the moon landing machine 15 and the lower surface of the seat plate 42 of the swing 18 is to avoid contacting.

As shown in FIGS. 2 and 3, the two rotating portions 39 of the swing 18 are arranged at intervals in the left-right direction and are rotatable with respect to the beam 37. On the outer peripheral surface of the left rotating portion 39, one end of the two hanging portions 40 is fixed, the two hanging portions 40 are provided so that the distance between each other is widened toward the seat plate 42, the other end of the two hanging portions 40 is fixed to the left end of the seat plate 42. Similarly, the outer peripheral surface of the right rotating portion 39, one end of the two hanging portions 40 is fixed, the two hanging portions 40 are provided so that the distance between each other is widened toward the seat plate 42, the other end of the two hanging portions 40 is fixed to the right end of the seat plate 42. A stopper 38 for restricting the movement of the two rotating portions 39 in the left-right direction along the beam 37 is attached to both left and right sides of the two rotating portions 39 in the beam 37.

Figure 4A:
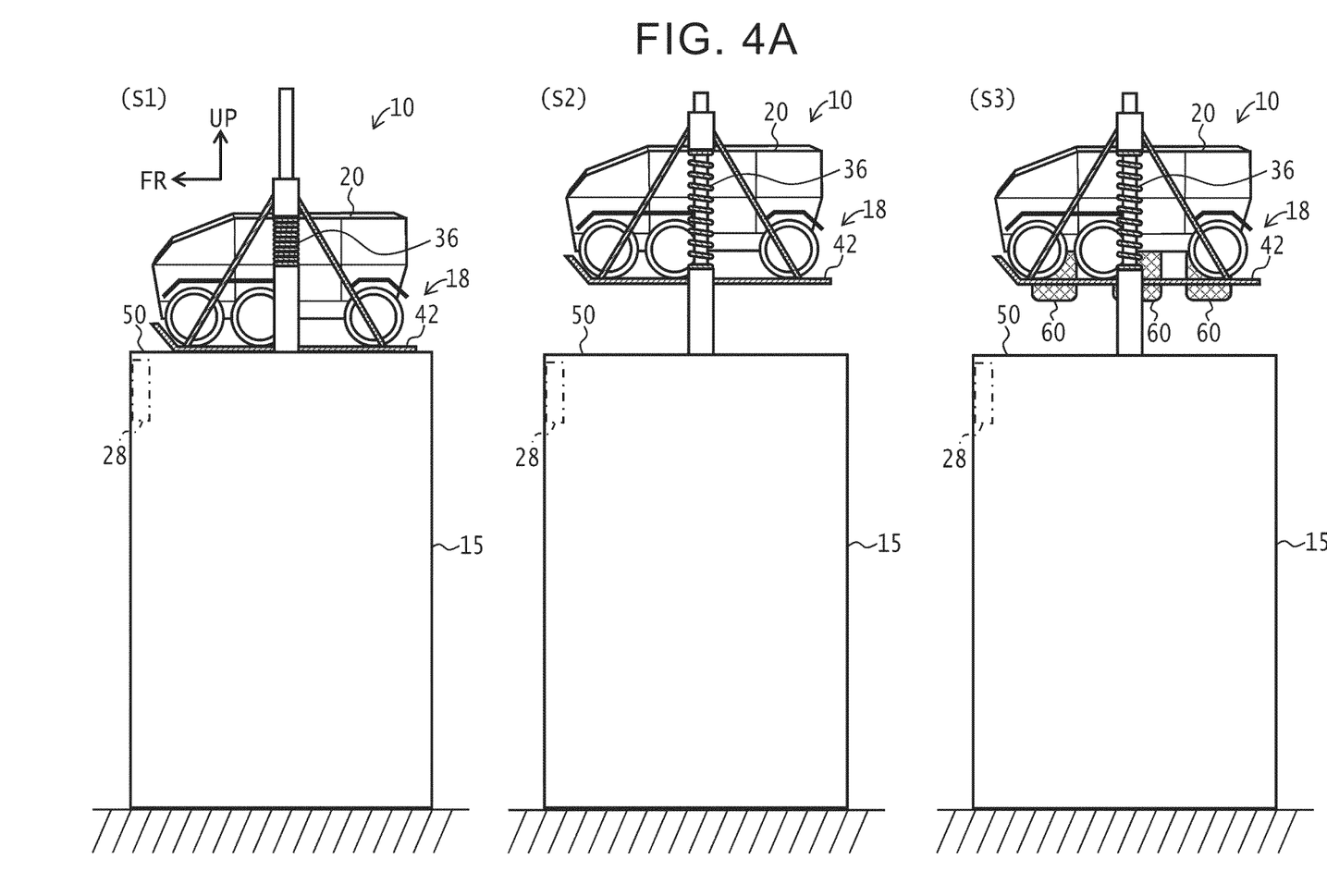
FIG. 4A is a diagram illustrating a process of lowering vehicle 20 to the moon plane.
Figure 4B:
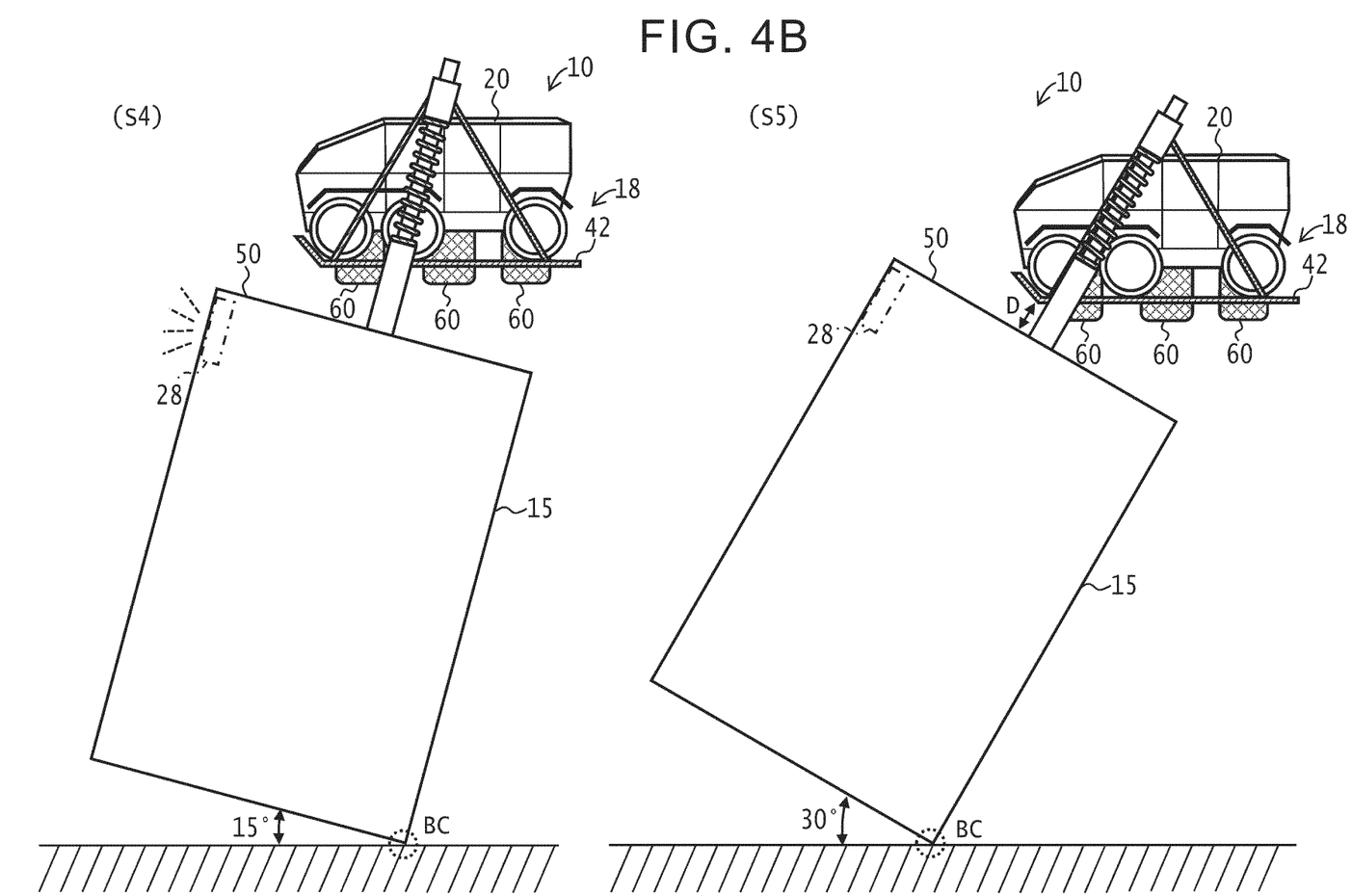
FIG. 4B is a diagram illustrating a process of lowering vehicle 20 to the moon plane following FIG. 4A.
Figure 4C:
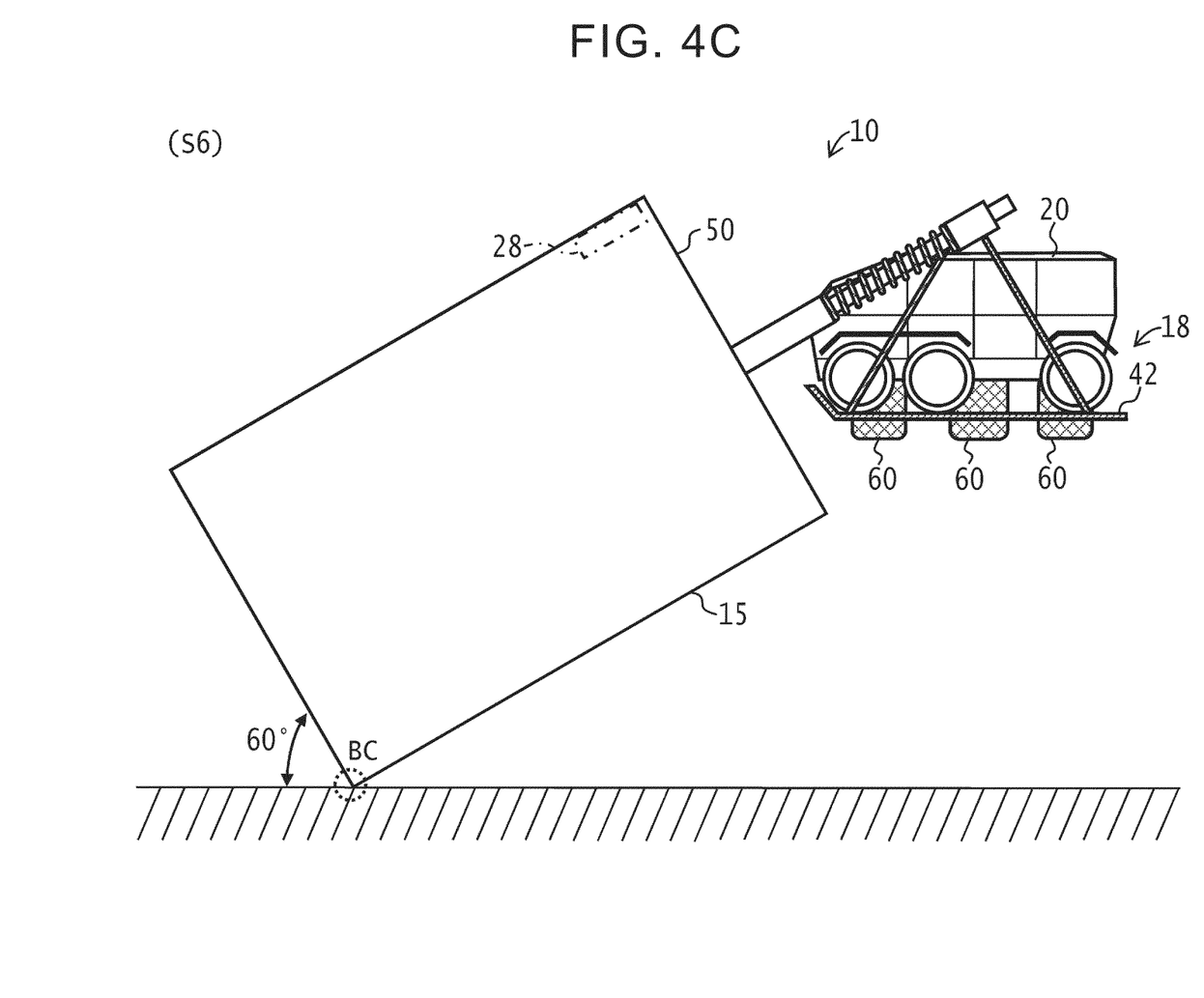
FIG. 4C is a diagram illustrating a process of lowering vehicle 20 to the moon plane following FIG. 4B.
Figure 4D:
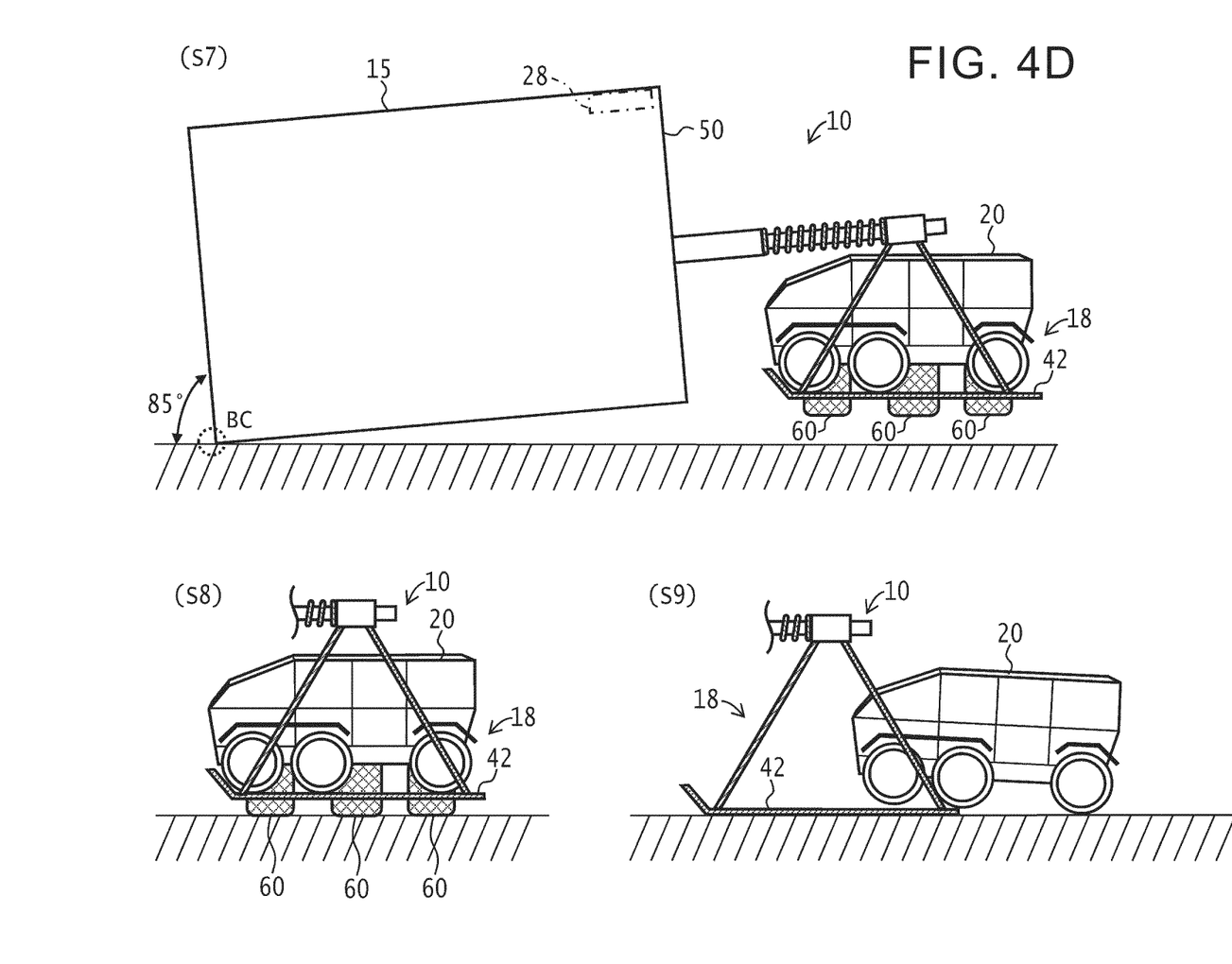
FIG. 4D is a diagram illustrating a process of lowering vehicle 20 to the moon plane following FIG. 4C.

Four hanging portion 40 is a rod-shaped having a high stiffness, as shown in (S7), (S8), and (S9) in FIG. 4D, the moon landing machine 15 is collapsed, when the seat plate 42 of the swing 12 lands on the moon surface, the upper It has a strength to support the load such as the support of the moon landing machine 15 and the swing 18.

As shown in FIG. 2, the seat plate 42 of the swing 18 has a rectangular shape in a top view. The seat plate 42 comprises, at its front, an upwardly curved wheel stop 46. Further, the seat plate 42 has a plurality of holes 43 arranged in the front-rear direction in the vicinity of the center in the left-right direction. As shown in S3 of FIG. 4A, the vehicle 20 includes a plurality of airbags 60 that inflate downward. When the airbags 60 of the vehicle 20 are inflated, the airbags 60 can protrude from the lower surface of the seat plate 42 through the holes 43 of the seat plate 42.

As shown in FIG. 2, on the upper surface 50 of the moon landing machine 15, a locking mechanism 22 is provided on each of the front, rear, left, and right sides of the seat plate 42 (a total of four lock mechanisms 22). Locking mechanism 22 includes a base portion 51 which is rotatably fixed to the upper surface 50 (top plate) of the moon landing machine 15, and a protruding portion 52 extending from the upper end of the base portion 51 toward the seat plate 42 side (in FIG. 2, only the locking mechanism 22 on the front side, the reference numerals of the base portion 51 and the protruding portion 52).

As shown in FIG. 2, the upper surface of the seat plate 42 comes into contact with the protruding portions 52 of the four locking mechanisms 22, whereby the lifting of the seat plate 42 by the two coil springs 36 is restricted. Further, by the base portion 51 of each locking mechanism 22 is rotated in the direction of the broken line arrow in FIG. 2, the protruding portion 52 of each locking mechanism 22 is removed from the upper side of the seat plate 42, as shown in FIG. 3, the seat plate 42 is raised by the two coil springs 36.

As shown in FIG. 1 and FIG. 4B, and the like, a thruster 28 is disposed on the upper front side of the arrival moon landing machine 15. As shown in (S4) of FIG. 4B, by injecting the gases forward from the thruster 28, the moon landing machine 15 can be tilted backward by the reaction.

Next, a process of lowering the vehicle 20 to the moon surface from the top of the moon landing machine 15 will be described. FIGS. 4A to 4D show the process of lowering the vehicle 20 to the lunar plane from the top of the moon landing machine 15 in the order of (S1) to (S9).

In (S1), the moon landing machine 15 lands on the moon surface.

(S2), the respective locking mechanisms 22 (see FIG. 2) operate, and the protruding portions 52 of the respective locking mechanisms 22 are disengaged from the upper side of the seat plate 42 of the swing 18, so that the seat plate 42 of the swing 18 is raised.

In (S3), the airbag 60 of the vehicle 20 is inflated, and the airbag 60 protrudes from the lower surface of the seat plate 42 of the swing 18.

In S4, the gas is injected from the thruster 28 of the moon landing machine 15. As a result, the moon landing machine 15 starts to fall to the rear side with the lower 20 corner BC of the swinging direction one side (rear side) of the moon landing machine 15 as the axis. The gravitational acceleration of the month is about ⅙ of the gravitational acceleration (G) of the earth.

In (S5), (S6), and (S7), the moon landing machine 15 gradually falls toward the moon plane. At this time, the seat plate 42 of the swing 18 is kept in a horizontal or near state. Thus, the vehicle 20 can go down toward the lunar plane in a horizontal or near state. It is possible to suppress a situation in which an object in the vehicle 20 rolls down due to the inclination of the vehicle 20.

In (S8), the seat plate 42 of the swing 18 lands on the lunar surface. At this time, the airbag 60 of the vehicle 20 can absorb an impact of landing of the seat plate 42.

In (S9), the airbag 60 of the vehicle 20 is deflated to collect the airbag 60 in the vehicle 20. Then, the vehicle 20 travels backward and descends from the seat plate 42 of the swing 18.

According to the embodiment described above, since the vehicle 20 can land on the moon surface in a state of being horizontal or close to the moon surface, it is possible to suppress a force from being locally applied from the moon surface to a part of the vehicle 20 when the vehicle 20 lands on the moon surface. Therefore, the risk of damage to the vehicle 20 can be reduced, and it is possible to prevent the vehicle 20 from requiring a special strength.

Note that the object lowering device 10 can function as an object raising device. The object lowering device 10 may be referred to as an object raising and lowering device. That is, by executing the above-described (S1) to (S9) in the reverse order, the vehicle 20 can be raised to the moon landing machine 15 while keeping the vehicle 20 horizontally or close to it. At this time, the airbag 60 of the vehicle 20 does not need to be inflated.

For example, on the earth, it is necessary to raise the vehicle 20 on the moon landing machine 15 in preparation for launching the multi-stage rocket 1. At this time, the seat plate 42 of the swing 18 is disposed on the ground in a state in which the moon landing machine 15 is tilted, and the vehicle 20 is placed there. After that, the moon landing machine 15 is raised by a crane or the like with the lower corner BC of the swinging direction one side of the moon landing machine 15. As a result, the vehicle 20 is lifted on the moon landing machine 15.

Note that the object to be raised and lowered by the moon landing machine 15 may be other than the vehicle 20. This embodiment can also be applied to various forms of raising and lowering objects on a pedestal on Earth. The moon landing machine 15 described above is an example of a pedestal, and the pedestal may be various. The vehicle 20 described above is an example of an object, and the object may be various.

Figure 5:
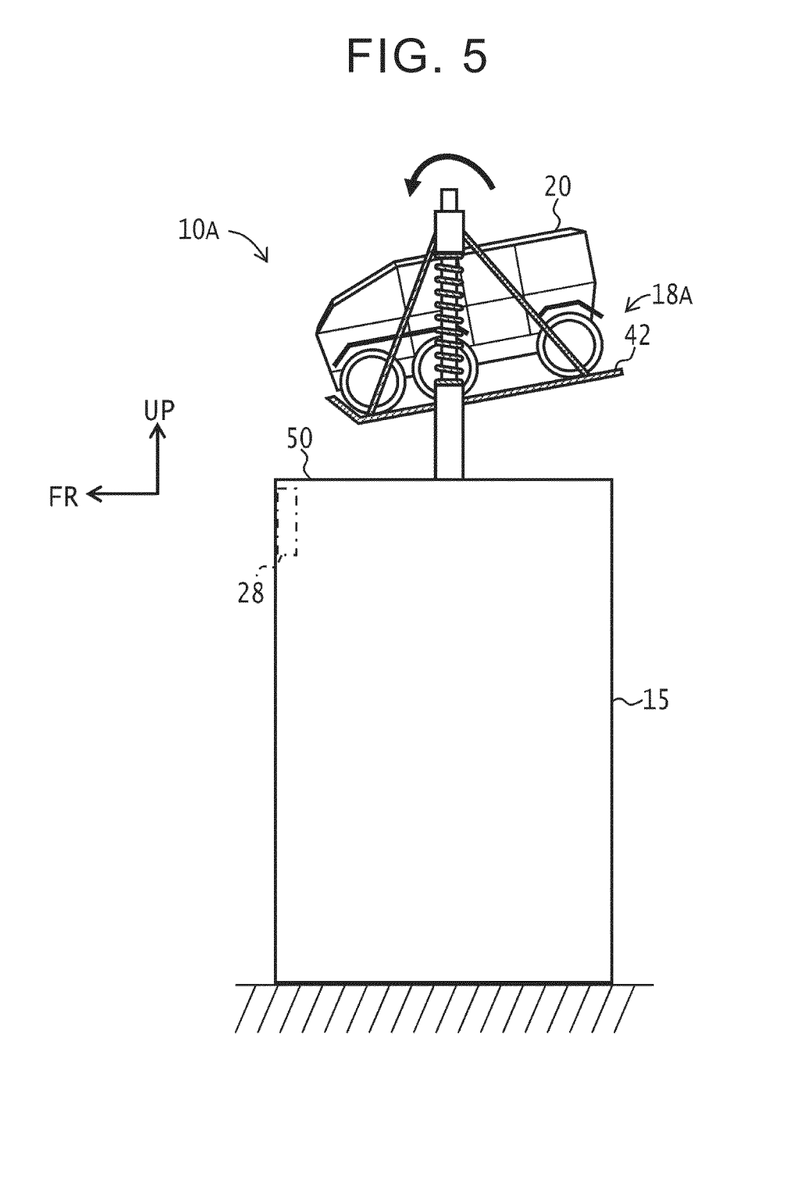
FIG. 5 is a side view of the object lowering device 10A according to the second embodiment.
Figure 6:
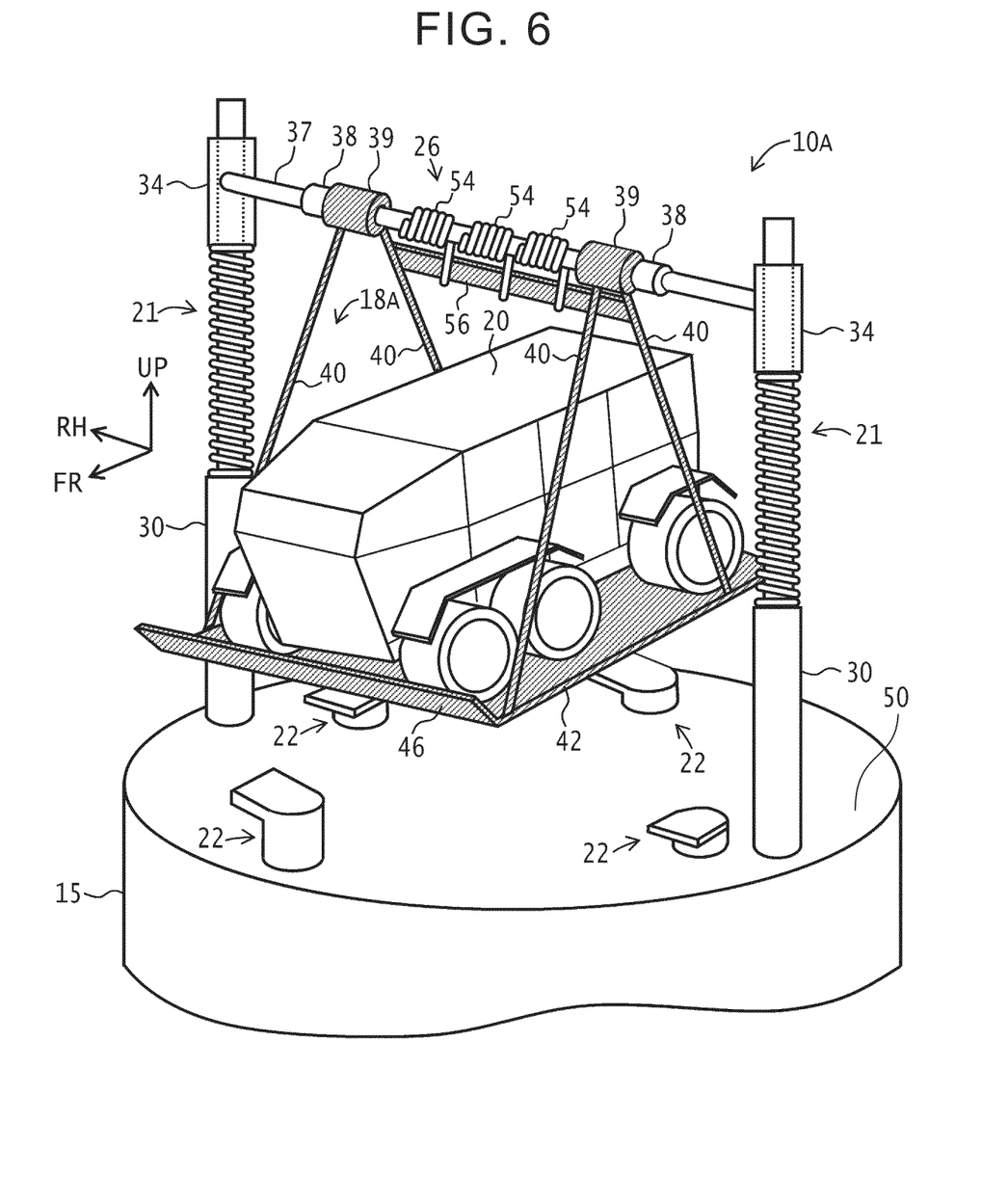
FIG. 6 is a perspective view of the object lowering device 10A according to the second embodiment.

Next, a second embodiment will be described. As shown in FIGS. 5 and 6, the object lowering device 10A according to the second embodiment is configured to defeat the moon landing machine 15 in a state in which the swing 18A is initially angled (a state in which the swing 18A is slightly tilted). The inventor conducted a simulation by a computer and an actual machine verification by a small and simple model simulating the object lowering device 10, and found that there is a possibility that the seat plate 42 of the swing 18 lands on the lunar plane in a slightly inclined state when the moon landing machine 15 falls down. In S7 of FIG. 4D, the seat plate 42 lands with the rear portion slightly lowered with respect to the front portion of the seat plate 42.

Therefore, the object lowering device 10A of the second embodiment, as shown in FIGS. 5 and 6, by biasing the rear portion with respect to the front portion of the seat plate 42 so as to be in a slightly raised state, by tilting the moon landing machine 15, by cancellation, when the seat plate 42 lands on the moon surface, the seat plate 42 is to be in a horizontal or close state. In other words, the force toward the swinging direction one side (rear side) is applied to the seat plate 42 while the moon landing machine 15 is fallen down, so that the seat plate 42 is kept in a horizontal or close state by the cancellation.

As shown in FIG. 6, the object lowering device 10A includes an angle adjustment mechanism 26 that applies a force toward one side (rear side) of the swinging direction to the seat plate 42 to adjust the swinging angle of the seat plate 42. The angle adjustment mechanism 26 includes an abutment plate 56 and a plurality of torsion springs 54. The abutment plate 56 is bridged between the upper portions of the two hanging portions 40 on the rear side of the swing 18. The plurality of torsion springs 54 have a beam 37 passed through the inside thereof, one end thereof being fixed to the outer peripheral surface of the beam 37, and the other end thereof being in contact with the abutment plate 56. The plurality of torsion springs 54 urge the seat plate 42 to the rear side via the abutment plate 56 and the two hanging portions 40.

According to the object lowering device 10A of the second embodiment, the seat plate 42 of the swing 18A can be kept in a horizontal or close state while the moon landing machine 15 is fallen down, and the vehicles 20 can land on the moon surface in a horizontal or close state. In this embodiment, the torsion spring 54 is used, but another biasing member such as a torsion bar may be used.

Figure 7:
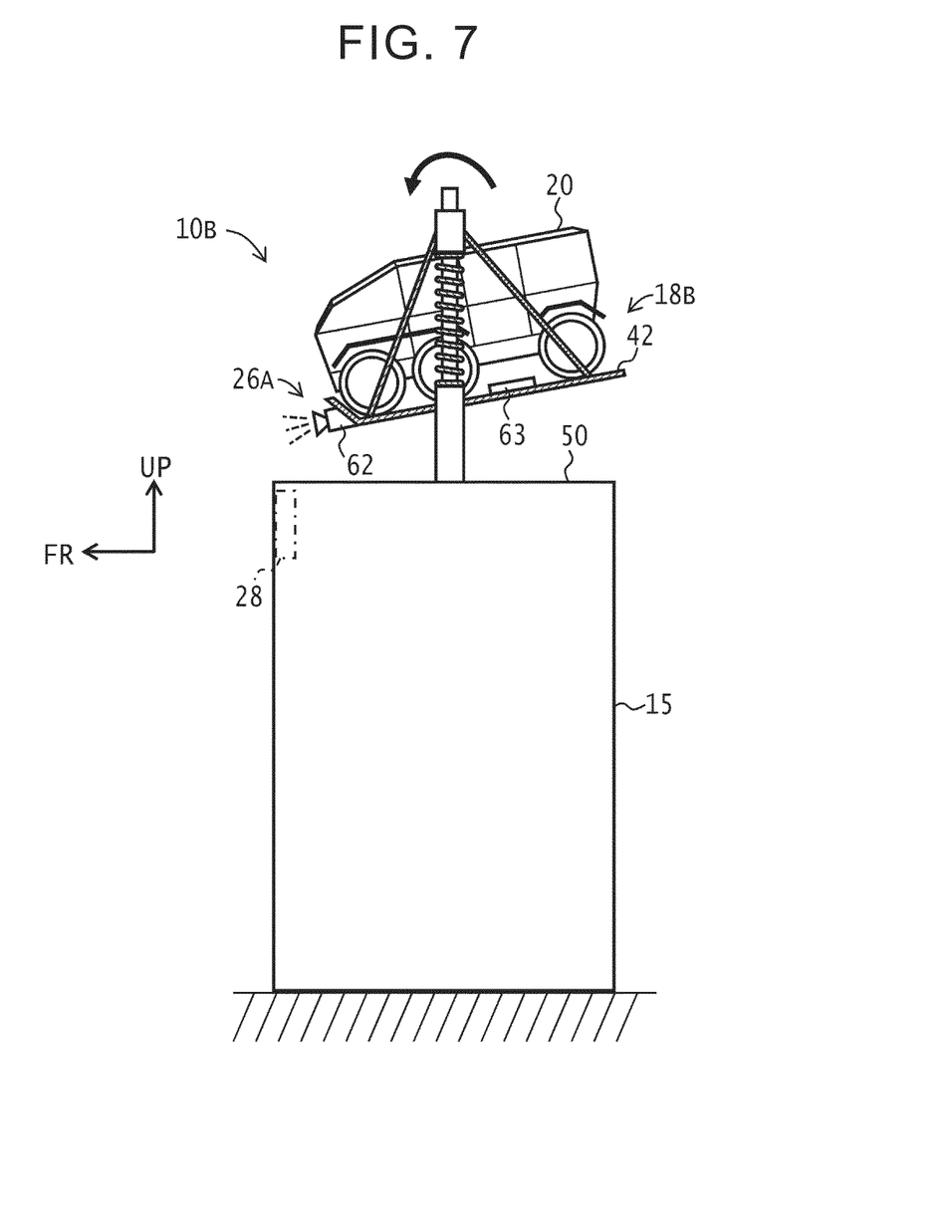
FIG. 7 is a side view of the object lowering device 10B according to the third embodiment.

Next, a third embodiment will be described. As shown in FIG. 7, the object lowering device 10B of the third embodiment is provided with an angle adjustment mechanism 26A that differs from the second embodiment. The angle adjustment mechanism 26A is a thruster 62 mounted to the front of the swing 18B seat plate 42. The thruster 62 injects a gas forward, and applies a force toward one side (rear side) in the swinging direction to the seat plate 42 due to the reaction to adjust the swinging angle of the seat plate 42. The thruster 62 injects gases while the moon landing machine 15 is collapsed, thereby keeping the swing 18A seat plate 42 horizontal or close to it and allowing the vehicles 20 to land on the moon plane horizontal or close to it.

In the third embodiment, the angle adjustment mechanism 26A may include a sensor 63 that detects the attitude of the seat plate 42. The sensor 63 is attached to the seat plate 42. The sensor 63 detects the attitude (inclination) of the seat plate 42 while the moon landing machine 15 is fallen down, and the thruster 62 injects gas so that the horizontal state of the seat plate 42 is maintained in accordance with the detection result. Even in this manner, the vehicle 20 can land on the moon surface in a state of being horizontal or close thereto.

Figure 8:
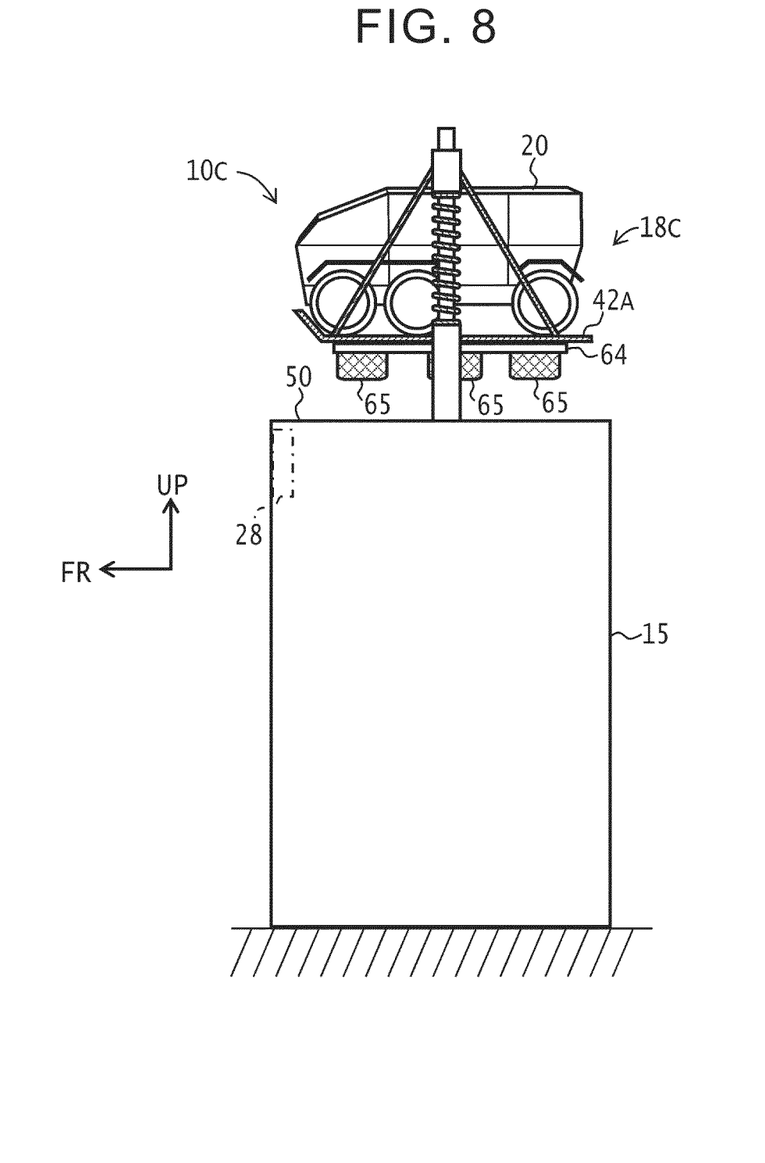
FIG. 8 is a side view of an object lowering device 10C according to a fourth embodiment.

Next, a fourth embodiment will be described. As illustrated in FIG. 8, the object lowering device 10C of the fourth embodiment absorbs an impact when the seat plate 42A of the swing 18C lands on the lunar surface by using the airbag 65 provided on the seat plate 42A of the swing 18C instead of the airbag of the above-described vehicles. The swing 18C of the object lowering device 10C includes a seat plate 42A in which an airbag device 64 is disposed on a lower surface thereof. The airbag device 64 on the seat plate 42A includes an airbag 65 that inflates downward. The airbag 65 is inflated before the seat plate 42A of the swing 18C descends to the lunar surface when the moon landing machine 15 is tilted toward the lunar surface.

The object lowering device 10C may include a thruster (not shown) disposed on the lower surface of the swing 18C on the seat plate 42A instead of the airbag device 64. In this situation, the thruster of the seat plate 42A injects the gases downward before the seat plate 42A of the swing 18C falls to the lunar surface when the moon landing machine 15 is tilted toward the lunar surface. As a result, an impact caused when the seat plate 42A of the swing 18C lands on the lunar surface is absorbed. The vehicle 20 may include a thruster disposed on the lower surface of the vehicle, and the thruster may inject gas downward through the holes 43 (see FIG. 2) of the seat plate 42 to absorb an impact when the seat plate 42 of the swing 18 lands on the lunar surface. As the object lowering device, various types of devices and the like can be employed as long as impact absorption and deceleration at the time of landing of a seat plate or an object (vehicle 20) can be performed.

Figure 9:
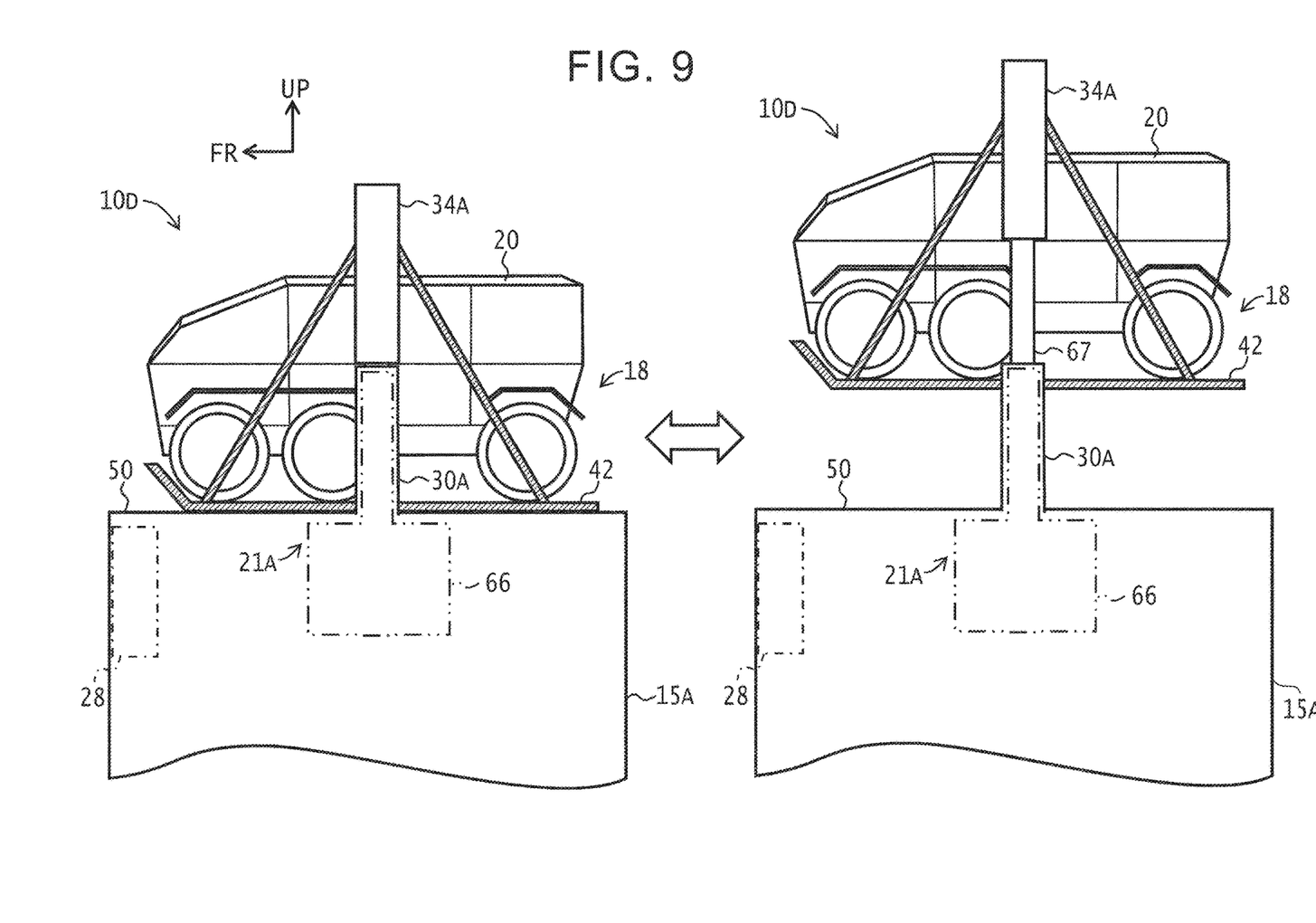
FIG. 9 is an explanatory diagram of the object lowering device 10D according to the fifth embodiment.

Next, a fifth embodiment will be described. As shown in FIG. 9, the object lowering device 10D of the fifth embodiment is provided with a beam raising mechanism 21A that differs from the beam raising mechanism using the above-described coiled spring. On the left side of FIG. 9, a state in which the beam of the swing 18 is lowered is shown, and on the right side of the drawing, a state in which the beam of the swing 18 is raised is shown.

The beam raising mechanism 21A comprises a hydraulic device 66, two fixed support columns 30A (only one is shown in FIG. 9), two piston rods 67 (only one is shown in FIG. 9) and two movable support column 34A (only one is shown in FIG. 9). Each fixed support column 30A has an outer shape of only the lower portion 31 of each fixed support column 30 shown in FIG. 3. Each movable support column 34A has the same outer shape as each movable support column 34 shown in FIG. 3 (although it may be cylindrical).

Hydraulic device 66 is located inside the moon landing machine 15A and the two fixed support column 30A. Each of the two piston rods 67 is rod-shaped with a circular cross-section and can extend upwardly from each of the upper ends of the two fixed support columns 30A by means of a hydraulic device 66 and can be retracted into each of the two fixed support columns 30A. The upper ends of the two piston rods 67 are fixed to two movable support column 34A. According to this embodiment, the beam of the swing 18 can be raised or lowered by controlling the hydraulic device 66.

In each of the above-described embodiments, each of the moon machine, the swing machine, and the vehicle may include a computer (also referred to as a controller) that controls operations of the respective units, the respective mechanisms, and the like. The computer includes a processor including a CPU and a storage device such as a RAM, ROM, a flash memory, and a hard disk. The processor operates according to a program and control data stored in the storage device. Further, the arrival moon machine, the swing, and the vehicle may include a communication device that exchanges information with each other in order to operate the respective units, the respective mechanisms, and the like in conjunction with each other. Further, the moon arrival machine, the swing, and the vehicle (e.g., computers that they have) may accept an instruction from an operator on the moon surface, the earth, or the like by the communication device, and operate each unit, each mechanism, or the like in accordance with the instruction.

What is claimed is:

1. An object lowering device, comprising:
   a pedestal; and
   a swing that includes a seat plate on which an object is placed and that is disposed on the pedestal, wherein
   when the pedestal is tilted with a lower corner of one side of the pedestal in a swinging direction of the swing as an axis, and the seat plate of the swing is lowered to a ground, the object is lowered to the ground;
   the pedestal is a rocket that lands on a lunar surface; and
   when the rocket is tilted on the lunar surface and the seat plate of the swing is lowered to the lunar surface, the object is lowered to the lunar surface.

2. The object lowering device according to claim 1, wherein
   the object is a vehicle that travels on the lunar surface.

3. The object lowering device according to claim 2, wherein:
   the vehicle includes an airbag that is inflated downward;
   the seat plate of the swing includes a hole through which the airbag projects from a lower surface of the seat plate when the airbag of the vehicle is inflated; and
   the airbag of the vehicle is inflated before the rocket is tilted toward the lunar surface and the seat plate of the swing is lowered to the lunar surface.

4. The object lowering device according to claim 2, wherein:
   the seat plate of the swing includes an airbag that is inflated downward; and
   the airbag of the seat plate is inflated before the rocket is tilted toward the lunar surface and the seat plate of the swing is lowered to the lunar surface.

5. The object lowering device according to claim 1, further comprising:
   a beam for supporting the seat plate of the swing on an upper side via a hanging portion; and
   a beam raising mechanism for raising the beam with respect to an upper surface of the pedestal before the pedestal is tilted and increasing a distance between the upper surface of the pedestal and the seat plate of the swing.

6. The object lowering device according to claim 1, further comprising:
   a locking mechanism for fixing the seat plate of the swing to an upper surface of the pedestal, wherein before the pedestal is tilted, fixing of the seat plate of the swing to the upper surface of the pedestal by the locking mechanism is released.

7. The object lowering device according to claim 1, further comprising:
   an angle adjustment mechanism for adjusting a swing angle of the seat plate by applying a force to the seat plate in the swinging direction of the swing while the pedestal is tilted.

8. An object raising and lowering device, comprising;
   an object lowering device including
   a pedestal; and
   a swing that includes a seat plate on which an object is placed and that is disposed on the pedestal, wherein:
   when the pedestal is tilted with a lower corner of one side of the pedestal in a swinging direction of the swing as an axis, and the seat plate of the swing is lowered to a ground, the object is lowered to the ground;
   the pedestal is a rocket that lands on a lunar surface;
   when the rocket is tilted on the lunar surface, and the seat plate of the swing is lowered to the lunar surface, the object is lowered to the lunar surface;
   the object lowering device functions as the object raising and lowering device; and
   when the seat plate of the swing is placed on the ground in a state where the pedestal is tilted, the object is placed on the seat plate, and the pedestal is raised with the lower corner of the one side of the pedestal in the swinging direction of the swing as the axis, the object is raised on the pedestal.

9. An object lowering device, comprising:
   a pedestal; and
   a swing that includes a seat plate on which an object is placed and that is disposed on the pedestal, wherein
   when the pedestal is tilted with a lower corner of one side of the pedestal in a swinging direction of the swing as an axis, and the seat plate of the swing is lowered to a ground, the object is lowered to the ground; and
   the object lowering device further comprises:
   a beam for supporting the seat plate of the swing on an upper side via a hanging portion; and
   a beam raising mechanism for raising the beam with respect to an upper surface of the pedestal before the pedestal is tilted and increasing a distance between the upper surface of the pedestal and the seat plate of the swing.

* * * * *